Patented Oct. 9, 1923.

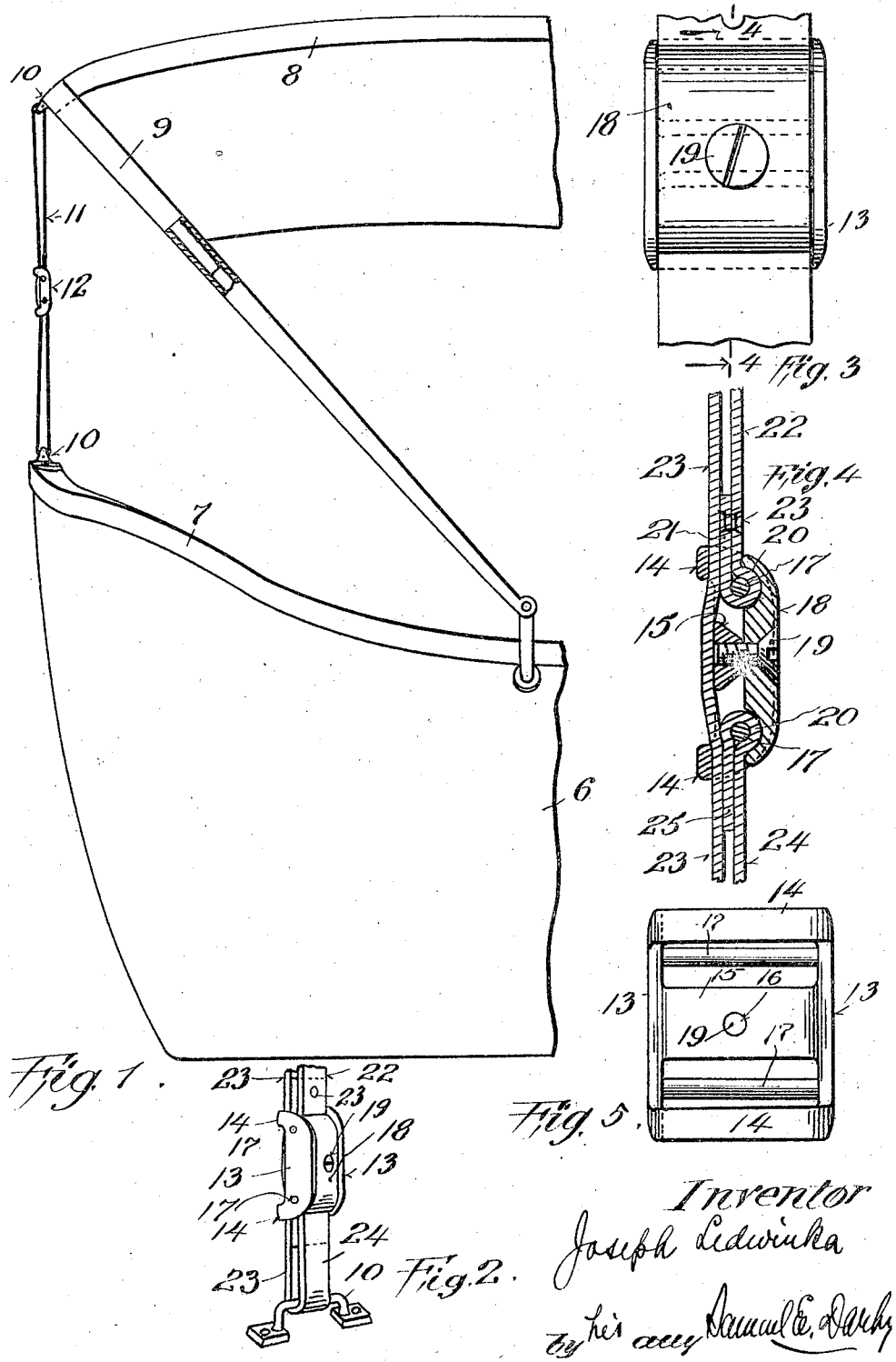

1,469,929

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

LOOP-STRAP-SECURING DEVICE FOR AUTOMOBILE TOPS.

Application filed April 28, 1920. Serial No. 377,250.

*To all whom it may concern:*

Be it known that I, JOSEPH LEDWINKA, a citizen of the United States, and a resident of Philadelphia, in the county of Philadelphia and State of Pennsylvania, have invented a new and useful Improvement in Loop-Strap-Securing Devices for Automobile Tops, of which the following is a specification.

This invention relates to loop straps for automobile tops.

The object of the invention is to provide a loop structure for automobile tops which is simple and efficient.

A further object of the invention is to provide means for adjusting the tension of loop straps for automobile tops and retaining the same in tensioned adjustment.

Other objects of the invention will appear more fully hereinafter.

The invention consists substantially in the construction, combination, location, and relative arrangement of parts, all as will be more fully hereinafter set forth, as shown in the accompanying drawings, and finally pointed out in the appended claims.

Referring to the accompanying drawings:—

Fig. 1 is a view in side elevation showing a loop strap embodying my invention applied to the rear end of an automobile top.

Fig. 2 is a view in perspective showing one end of the loop strap and the manner of securing the same to the top rail of an automobile body, for example, and showing the application thereto of a tension adjusting device therefor, embodying the principles of my invention.

Fig. 3 is a view in elevation of the tension adjusting device.

Fig. 4 is a broken detail view in section on the line 4—4 of Fig. 3, looking in the direction of the arrows.

Fig. 5 is a detached detail view of the body part of the tension adjusting device.

It is a common practice to provide automobile tops or the bows or frame parts thereof with suitable means for connecting the same with the top rail of the automobile body, the purpose being to enable such connections to take the strains which might otherwise be imposed upon the curtains which are ordinarily carried by the top and attached by buttons or otherwise to the automobile body. A common expedient employed for this purpose is a strap having engaging hooks at its ends which engage in suitable fastenings formed in or carried by the top bow or frame and in the top rail of the automobile body respectively. The objection to such arrangement is that when the top is folded back into retracted position the hooks at the ends of the strap become disengaged from their fastenings and, when the top is again distended over the automobile, the distended strap is liable to be overlooked or misplaced with the result that the top strains are transmitted to the top curtains or other coverings.

Moreover, in the use of strain straps of this nature it frequently happens that through the stress imposed on such straps they become loose and slack, thereby failing to take the strains of the top and hence failing in the accomplishment of their purpose.

It is among the special purposes of my present invention to avoid the objections noted and to provide a loop strap arrangement which does not become detached from its fastenings to the top bow or frame and the automobile body top rail when the top is folded back, and which may also be tightened up when occasion may require and efficiently retained in taut condition without danger of slipping.

In the drawing 6 designates a portion of the body of an automobile, 7 the top rail of such body, 8 the top and 9 one of the bows of the top frame. Carried by or secured to the bow 9 and the top rail 7 respectively are attaching devices 10. These attaching devices each consist of a simple bar suitably secured at its ends to the bow or top frame 9 and rail 7 respectively. The strap 11 of cloth, leather or other suitable material, is looped through the attaching devices 10 and the ends thereof brought to a tensioning device indicated generally at 12, and suitably secured thereto. This tensioning device comprises a frame consisting of side plates 13 which are connected together at their ends by cross bars 14, which cross bars are offset laterally away from the plane of the adjacent edges of the side bars. The side bars 13 are also connected together intermediate their ends by a cross strut or portion 15, one surface thereof lying in the plane of the edge surfaces of the side members, while the other surface thereof lies within the plane of the other edges of said side members. In practice the strut or cross member 15 is preferably of tapering structure in cross section, as shown in Fig. 4, and is formed with a central screw opening 16. The side members 13 are also connected adjacent their ends by means of pins or studs 17. A clamp plate 18 is designed to be received between the side members 13 and to be secured to the body of the tension device as, for example, by means of a screw 19 passing centrally through said clamp plate and into the threaded opening 16 in the cross bar 15. The end portions of the clamp 18 are curved to form engaging seats as indicated at 20 designed to engage over the connecting cross studs 17.

In applying the strap, one end thereof is looped around one of the studs 17, as indicated at 21, and is riveted or otherwise secured to the leg or rung 22 of the strap as indicated at 23 (see Figs. 2 and 4). The leg or rung 22 of the strap is then passed, for example, through the attaching device 10 secured to the top bow 9 and thence downwardly, as at 23, and is looped around or through the attaching device 10 on the top rail 7 and thence the leg or rung 24 is passed upwardly and looped around the other cross stud 17. The looped strap is then brought to the desired tension to take the strains of the automobile top and to relieve the top curtains or other coverings of such strains and then the clamp plate 18 is applied with the curved seats 20 thereof engaging over the loops around the studs 17 and the screw 19 is inserted and screwed up, thereby clamping the strap in its position of tension adjustment. When the necessity arises for readjusting the tension of the strap, the screw 19 is loosened and a pull is applied to the end portion 25 of the strap until the desired tension adjustment is again attained and then the clamp plate 18 is again clamped up by tightening the screw 19.

If desired, and as shown, the leg or rung 23 of the strap which extends from the attaching device 10 on the top bow to the attaching device 10 on the body top rail may pass through or within the cross members 14 at the ends of the tensioning device.

From the foregoing description it will be seen that I provide an exceedingly simple and efficient permanent securing arrangement for the strain strap of automobile tops and which affords means for adjusting the tension of such strap and for effectively holding the same in its tension adjustment.

Having now set forth the objects and nature of my invention, and a structure embodying the principles thereof, what I claim as new and useful and of my own invention and desire to secure by Letters Patent is:—

1. A device for connecting the ends of a strap comprising a frame, having oppositely-disposed cross bars around which the free ends of the strap are looped, and a clamping plate detachably secured to said frame and cooperating with said cross bars to clamp portions of said strap between said plate and cross bars.

2. A device for connecting the free ends of a strap comprising a frame having side members connected by cross bars, the free ends of said strap being looped around said cross bars, and a clamping plate fitting between said side members and detachably secured to said frame, said clamping plate cooperating with the cross bars to clamp portions of said strap between said plate and cross bars.

3. A device for connecting the free ends of a strap comprising a pair of side members and a plurality of cross members connecting said side members, the free ends of said strap being looped around certain of said cross members, and a clamping plate detachably secured to the central cross member and provided with curved ends cooperating with the said cross members to clamp the looped ends of said strap in position thereon.

4. A device for connecting the free ends of a strap consisting of a frame having cross bars, around which the free ends of the strap are respectively looped, one of said ends, after looping around its cross bar, being secured to a standing part of the strap, and a removable plate for clamping the looped ends of the strap to said frame.

5. A device for connecting the free ends of a strap comprising a body having cross bars around which the free ends of the strap are respectively looped, and a clamping plate detachably mounted on said body and binding the looped ends of the strap thereto.

6. A device for connecting the free ends of a strap comprising a body having side portions and cross bars connecting them, around which the free ends of the strap are looped, and a clamping plate fitting between said side portions and detachably connected to the body to clamp the looped ends of the strap thereto.

7. A device for connecting the free ends of a strap, comprising a body, having spaced side portions connected together at their ends, a cross bar adjacent each end of said body around which one end of the strap is looped, and a clamping plate fitting between said side portions and having seats at its ends to engage the loops of the strap ends and clamp the same to said cross bars.

8. A device for connecting the free ends of a strap, comprising a body having spaced side portions and a centrally-disposed cross member connecting the same, cross bars disposed between said side portions adjacent each end of said body, around which the free ends of the strap are looped, and a clamping plate fitting between said side portions and detachably secured to said cross member, said plate having its ends engaging the looped end portions of the strap to clamp the same to the cross bars.

9. A device for connecting the free ends of a strap comprising a body having side portions connected together at their ends by cross members, cross bars also connecting said side portions, the ends of the strap being looped around said cross bars, and a clamping plate fitting between said side portions and detachably connected to the body portion and engaging the looped ends of the strap to clamp the same upon the cross bars and cross members.

In testimony whereof I have hereunto set my hand on this 24th day of April A. D., 1920.

JOSEPH LEDWINKA.